United States Patent [19]

Enami et al.

[11] Patent Number: 6,001,918
[45] Date of Patent: Dec. 14, 1999

[54] SILICONE GEL COMPOSITION FOR USE AS A SEALANT AND A FILLER FOR ELECTRICAL AND ELECTRONIC COMPONENTS AND A GEL PREPARED FROM THIS COMPOSITION

[75] Inventors: Hiroji Enami; Akihiro Nakamura; Yuji Hamada; Takeaki Saiki, all of Chiba Prefecture, Japan

[73] Assignee: Dow Corning Toray Silicone Co., Ltd., Tokyo, Japan

[21] Appl. No.: 09/110,633

[22] Filed: Jul. 6, 1998

[30] Foreign Application Priority Data

Jul. 10, 1997 [JP] Japan .................................. 9-200861

[51] Int. Cl.$^6$ ..................................................... C08K 3/34
[52] U.S. Cl. ......................... 524/493; 524/847; 524/714; 528/15; 528/21; 528/31; 528/32; 427/387
[58] Field of Search ..................................... 524/714, 847, 524/493; 528/21, 15, 31, 32; 427/387

[56] References Cited

U.S. PATENT DOCUMENTS

| 4,340,709 | 7/1982 | Jeram et al. | 528/15 |
| 5,332,795 | 7/1994 | Fujiki et al. | 528/15 |
| 5,334,687 | 8/1994 | Ikeno | 528/15 |
| 5,516,838 | 5/1996 | Fujiki et al. | 524/711 |

FOREIGN PATENT DOCUMENTS

| 47-17847 | 3/1973 | Japan . |
| 48-17847 | 3/1973 | Japan . |
| 58-7452 | 1/1983 | Japan . |
| 5-204259 | 11/1984 | Japan . |
| 59-204259 | 11/1984 | Japan . |
| 61-48945 | 3/1986 | Japan . |
| 62-104145 | 5/1987 | Japan . |
| 3-19269 | 3/1991 | Japan . |

*Primary Examiner*—Melvyn I. Marquis
*Assistant Examiner*—Mark W. Milstead
*Attorney, Agent, or Firm*—Larry A. Milco

[57] ABSTRACT

A silicone gel composition comprising: (A) 100 parts by weight of an organopolysiloxane containing at least two alkenyl groups per molecule and having a viscosity of 0.01 to 100 Pa.s at 25° C.; (B) an organopolysiloxane containing at least two silicon-bonded hydrogen atoms per molecule and having a viscosity of 0.001 to 10 Pa.s at 25° C. in an amount sufficient to provide from 0.2 to 5 moles of silicon-bonded hydrogen atoms per one mole of alkenyl groups in component (A); (C) 0.01 to 15 parts by weight of a silica powder having a specific surface area of at least 50 m$^2$/g; (D) 0.0001 to 1.0 part by weight of a diamine compound represented by the following general formula: $R^1{}_2N$—$R^2$—$NR^1{}_2$ wherein each $R^1$ is independently a hydrogen atom or an alkyl group having 1 to 4 carbon atoms, and $R^2$ is an alkylene group having 2 to 4 carbon atoms; and (E) a hydrosilylation catalyst in a catalytic quantity; wherein the weight ratio of component (D) to component (C) in said gel composition is from 0.0005 to 0.05; and the silicone gel composition cures to form a silicone gel having a loss elastic modulus at 25° C. and at a shear frequency of 0.1 Hz of from $1.0 \times 10^2$ to $1.0 \times 10^4$ Pa, and a complex modulus of elasticity less than $1.0 \times 10^5$ Pa.

20 Claims, 1 Drawing Sheet

SILICONE GEL COMPOSITION FOR USE AS A SEALANT AND A FILLER FOR ELECTRICAL AND ELECTRONIC COMPONENTS AND A GEL PREPARED FROM THIS COMPOSITION

FIELD OF THE INVENTION

The present invention relates to a silicone gel composition for sealing and filling electrical and electronic components and to a silicone gel obtained from this composition. More particularly, the present invention relates to a silicone gel composition that restricts formation of air bubbles and cracks in the silicone gel that seals or fills electrical and electronic components and that possesses excellent combustion-resistant properties. The invention further relates to a silicone gel that restricts formation of air bubbles and cracks when it seals or fills electrical and electronic components.

BACKGROUND OF THE INVENTION

Since after being cured, silicone compositions form silicone gels that are characterized by excellent stress-buffering properties, electrical properties, resistance to heat, and weather-proof properties, they find application for sealing and filling various electrical and electronic components (see Japanese Patent Publications [Kokai] No. 59-204259, No. 61-48945, and No. 62-104145). For example, Japanese Patent Publication [Kokai] No. 48-17847 describes a composition comprising a branch-chained vinyl-containing organopolysiloxane having a viscosity of 0.01 to 10 Pa.s at 25° C., a linear diorganopolysiloxane having silicon-bonded hydrogen atoms, and a hydrosilylation catalyst; Japanese Patent Publication [Kokai] No. 58-7452 discloses a silicone gel composition comprising a branched vinyl-containing organopolysiloxane and a hydrosilylation catalyst; and Japanese Patent Publication (Kokoku) No.3-19269 discloses a silicone gel composition comprising a branched vinyl-containing organopolysiloxane having a viscosity of 0.02 to 10 Pa.s at 25° C., a linear diorganopolysiloxane with both molecular-chain terminals sealed with vinyl groups, a linear diorganopolysiloxane having silicon-bonded hydrogen atoms only at both molecular-chain terminals, and a hydrosilylation catalyst.

However, when the aforementioned silicone gel compositions are used for sealing or filling electrical and electronic components of complicated structure, heat cycles during the operation of these components may cause formation of air bubbles and cracks in the silicone gel used for sealing or filling, whereby reliability of the aforementioned electrical and electronic components is decreased. It can be assumed that air bubbles and cracks occur in the silicone gel that fills aforementioned electrical and electronic components because such components have very narrow spaces between electrodes, electrical elements, electrical elements and the package, etc., as well as because silicone gel material itself is subject to expansion and shrinkage.

Furthermore, in order to make a judgment about the quality of silicone gel used for sealing and filling electrical and electronic components, it is required that this silicone gel be transparent or semitransparent. However, the transparent or semitransparent silicone gel has poor combustion-resistance properties and therefore it is not applicable for sealing or filling those electrical or electronic components which are designed for long-term use under elevated temperatures.

SUMMARY OF THE INVENTION

As a result of studies aimed at the solution of the above problems, the inventors arrived at the present invention.

More specifically, it is an object of the present invention to provide a silicone gel composition that restricts formation of air bubbles and cracks in the silicone gel which fills or seals electrical or electronic components and that possesses excellent combustion-resistance properties. It is another object to provide a silicone gel for filling and sealing electrical and electronic components, the aforementioned gel restricting formation of air bubbles and cracks and having excellent combustion-resistance properties. Still another object is to provide electrical and electronic components of high reliability.

A silicone gel composition of the present invention, for use as a sealant and a filler for electrical and electronic components, comprises:

(A) 100 parts by weight of an organopolysiloxane containing at least two alkenyl groups per molecule and having a viscosity of 0.01 to 100 Pa.s at 25° C.;

(B) an organopolysiloxane containing at least two silicon-bonded hydrogen atoms per molecule and having a viscosity of 0.001 to 10 Pa.s at 25° C. in an amount sufficient to provide from 0.2 to 5 moles of silicon-bonded hydrogen atoms per one mole of alkenyl groups in component (A);

(C) 0.01 to 15 parts by weight of a silica powder having a specific surface area of at least 50 $m^2/g$;

(D) 0.0001 to 1.0 part by weight of a diamine compound represented by the following general formula:

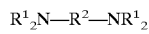

$R^1{}_2N-R^2-NR^1{}_2$ wherein each $R^1$ is independently a hydrogen atom or an alkyl group having 1 to 4 carbon atoms, and $R^2$ is an alkylene group having 2 to 4 carbon atoms; and (E) a hydrosilylation catalyst in a catalytic quantity;

wherein the weight ratio of component (D) to component (C) in said gel composition is from 0.0005 to 0.05; and the silicone gel composition cures to form a silicone gel having a loss elastic modulus at 25° C. and at a shear frequency of 0.1 Hz of from $1.0 \times 10^2$ to $1.0 \times 10^4$ Pa, and a complex modulus of elasticity less than $1.0 \times 10^5$ Pa.

A silicone gel of the present invention is obtained by curing the aforementioned silicone gel composition for sealing and filling electrical and electronic parts.

EXPLANATION OF SYMBOLS

Figure 1:
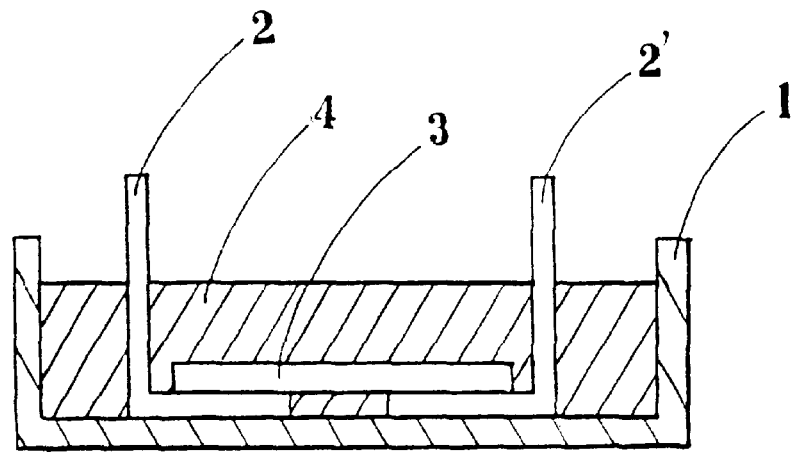
FIG. 1 is a sectional view of the electrical/electronic component evaluated in the examples of the present invention.
Figure 2:
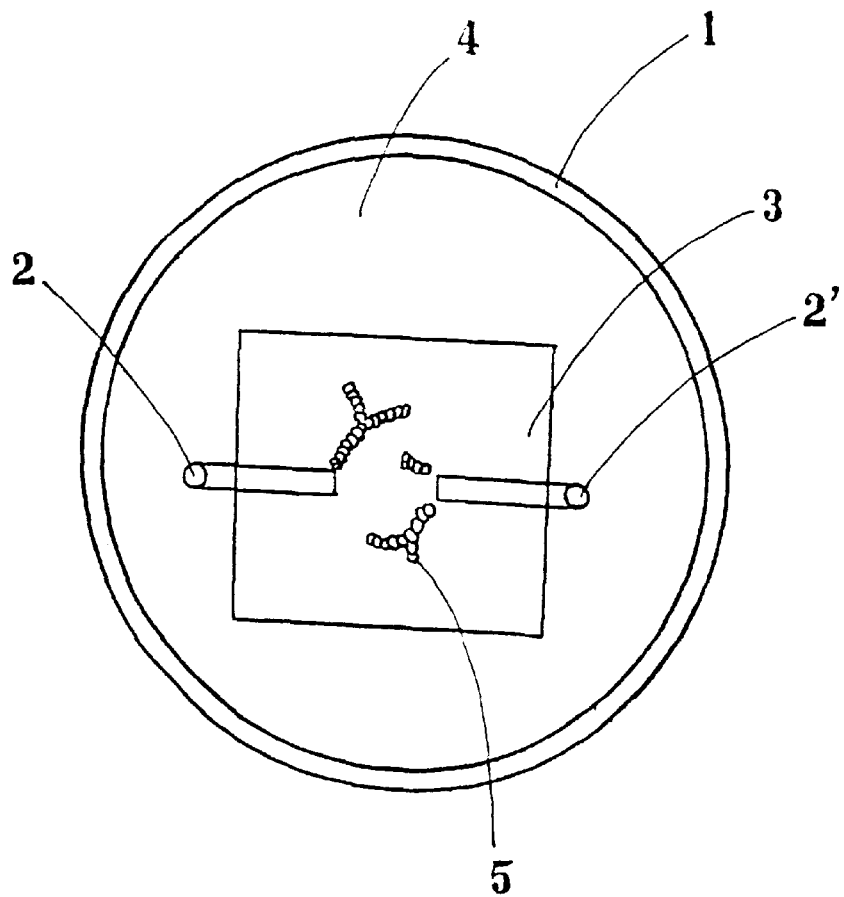
FIG. 2 is a plan view illustrating an electrical/electronic component in which gas bubbles and cracks were formed in the silicone gel (among the electrical/electronic components evaluated in the examples of the present invention).

1=Glass Petri dish
2 and 2'=Electrodes
3=Glass plate
4=Silicone gel
5=Gas bubbles and cracks.

DETAILED DESCRIPTION OF THE INVENTION

A silicone composition of the invention for sealing or filling electrical and electronic components will now be considered in more detail.

The organopolysiloxane which is component (A) is the main ingredient of the composition of the invention. It is characterized by the fact that at 25° C. it has a viscosity of 0.01 to 100 Pa.s and contains in one molecule at least two alkenyl groups. This is because, with the viscosity which at 25° C. is below the aforementioned value, the obtained silicone gel will have impaired physical characteristics, and with the viscosity exceeding the aforementioned value the obtained silicone gel composition will be difficult to handle under industrial conditions. Furthermore, if there are less than two alkenyl groups in one molecule, it would be difficult to ensure complete curing of the obtained silicone composition. Alkenyl groups suitable for use in component (A) may be represented by vinyl groups, allyl groups, butenyl groups, and hexenyl groups. Preferable among them are vinyl groups. It is preferable that groups other than alkenyl groups that may be bonded to silicon atoms in component (A) be the following: methyl groups, ethyl groups, propyl groups, or similar alkyl groups; phenyl groups, tolyl groups, or similar aryl groups; monovalent hydrocarbon groups such as 3,3,3-trifluoropropyl groups, or similar halogenated alkyl groups, as well as minute quantities of hydroxyl groups and alkoxy groups such as methoxy groups. Preferable among the above are methyl groups, phenyl groups, and 3,3,3-trifluoropropyl groups. There are no special limitations with regard to the molecular structure of component (A), and the latter may have a linear, branched, or cyclic structure. In the event component (A) consists only of branched organopolysiloxane, or of a mixture of organopolysiloxanes that contains at least branched organopolysiloxanes, it would be relatively easy to prepare from the composition of the invention a silicone gel which will have the following characteristics after curing: loss elastic modulus at 25° C. and at a shear frequency of 0.1 Hz within the range of $1.0 \times 10^2$ to $1.0 \times 10^4$ Pa, and a complex modulus of elasticity less than $1.0 \times 10^5$ Pa. For this combination, it is recommended that component (B) be represented by a linear diorganopolysiloxane which has silicon-bonded hydrogen atoms only on both terminals of the molecular chain. On the other hand, if component (A) consists only of linear diorganopolysiloxane, in particular, only of a linear diorganopolysiloxane having alkenyl groups only on both terminals of the molecular chain, for the same reasons as disclosed above, best results would be obtained with component (B) in the form of a mixture of a linear diorganopolysiloxane having silicon-bonded hydrogen atoms only in side molecular chains with a linear diorganopolysiloxane having silicon-bonded hydrogen atoms only on both terminals of the molecular chain.

The aforementioned branch-chained organopolysiloxane is an organopolysiloxane that has an entirely branched molecular structure or a partially branched linear molecular structure. More specifically, it may be an organopolysiloxane which contains in its molecular structure an $RSiO_{3/2}$ unit (where R is a monovalent hydrocarbon group) and/or a $SiO_{4/2}$ unit. Such an (A) component may consist of a branched organopolysiloxane alone, or may comprise a mixture of a branched organopolysiloxane with a linear organopolysiloxane. For the purposes of the present invention, the last-mentioned combination is preferable. There are no special limitations with regard to a ratio between the branched and linear organopolysiloxanes. It is recommended, however, that the content of the branched organopolysiloxane in component (A) be within the range of 5 to 95 wt. %, preferably within the range of 10 to 90 wt. %, and still more preferably, between 20 and 80 wt. %. This is because, when the content of the branched organopolysiloxane in component (A) is beyond the recommended range, it would be difficult to obtain the silicone gel which, at 25° C. and at a shear frequency of 0.1 Hz, would after curing have a loss elastic modulus within the range of $1.0 \times 10^2$ to $1.0 \times 10^4$ Pa and a complex modulus of elasticity less than $1.0 \times 10^5$ Pa. Furthermore, beyond the prescribed limits of the branched organopolysiloxane, the gel which fills or seals electrical or electronic components will show a tendency to formation of air bubbles and cracks.

More specifically, the aforementioned branched organopolysiloxane is a polymer which contains $R_2SiO_{2/2}$ units, $RSiO_{3/2}$ units, and $R_3SiO_{1/2}$ units. In the above units, R may be represented by methyl groups, ethyl groups, propyl groups, or similar alkyl groups; vinyl groups, allyl groups, butenyl groups, hexenyl groups, or similar alkenyl groups; phenyl groups, tolyl groups, or similar aryl groups; monovalent hydrocarbon groups such as 3,3,3-trifluoropropyl groups, or similar halogenated alkyl groups, as well as minute quantities of hydroxyl groups and alkoxy groups such as methoxy groups. However, in the aforementioned polymer, at least one R should contain an alkenyl group. There are no special limitations with regard to a ratio between the units. It is recommended, however, that $R_2SiO_{2/2}$ units be contained in an amount of 80.00 to 99.65 mole %, $RSiO_{3/2}$ units be contained in an amount of 0.10 to 10.00 mole %, and the balance be left for $R_3SiO_{1/2}$ units.

It is recommended that the linear diorganopolysiloxane be selected form the following compositions: a dimethyl polysiloxane having both molecular-chain terminals sealed with dimethylvinylsiloxy groups; a copolymer of methylphenylsiloxane and dimethylsiloxane having both molecular chain terminals sealed with dimethylvinylsiloxy groups; a copolymer of methylphenylsiloxane and dimethylsiloxane having both molecular chain terminals sealed with trimethylsiloxy groups; a copolymer of methylphenylsiloxane, methylvinyl siloxane, and dimethylsiloxane having both molecular-chain terminals sealed with trimethylsiloxy groups; a copolymer of methylvinylsiloxane and a dimethylsiloxane having both molecular-chain terminals sealed with silanols; a polymer in which a part of methyl groups in the aforementioned polymers is substituted by an alkyl group other than a methyl group such as an ethyl group, propyl group, etc., or by a halogenated alkyl group such as 3,3,3-trifluoropropyl group; a polymer in which vinyl groups of the aforementioned polymers are substituted by alkenyl groups other than vinyl groups such as allyl groups, butenyl groups, hexenyl groups, etc.; or a combination of two or more of the above polymers. Most preferable among the above are linear diorganopolysiloxanes having alkenyl groups only on both molecular-chain terminals.

In the composition of the present invention, the organopolysiloxane of component (B) is a cross-linking agent which at 25° C. has a viscosity within the range of 0.001 to 10 Pa.s and which has in one molecule at least two silicon-bonded hydrogen atoms. If the viscosity at 25° C. is below the recommended value, the obtained silicone gel will have impaired physical properties. If, on the other hand, the viscosity is above the recommended value, it would be difficult to handle the obtained silicone gel composition under industrial conditions. The following are examples of organic groups bonded to silicon atoms in component (B): methyl groups, ethyl groups, propyl groups, or similar alkyl groups; phenyl groups, tolyl groups, or similar aryl groups; monovalent hydrocarbon groups, except for alkenyl groups, such as 3,3,-trifluoropropyl groups, or similar halogenated alkyl groups. There are no special limitations with regard to the molecular structure of component (B), and it may have a linear, branched, or cyclic structure. The organopolysiloxane of component (B) may be represented by a linear diorganopolysiloxane having silicon-bonded hydrogen atom at least only on both molecular-chain terminals. In particular, if component (A) consists of a branched organopolysiloxane alone, or comprise a mixture of a branched organopolysiloxane at least with a branched organopolysiloxane, it would be relatively easy to prepare a silicone composition for the formation of a silicone gel which, at 25° C. and at a shear frequency of 0.1 Hz, would after curing have a loss elastic modulus within the range of $1.0 \times 10^2$ to $1.0 \times 10^4$ Pa and a complex modulus of elasticity less than $1.0 \times 10^5$ Pa. Therefore, it is recommended to use component (B) in the form of a linear diorganopolysiloxane having hydrogen-bonded silicon atoms only on both molecular-chain terminals. If component (A) consists of a linear diorganopolysiloxane alone, in particular, of a linear diorganopolysiloxane having alkenyl groups on both molecular-chain terminals, then for the reasons described above, it is recommended to utilize component (B) in the form of a mixture of a linear diorganopolysiloxane having silicon-bonded hydrogen atoms only at both molecular-chain terminals with a linear diorganopolysiloxane having silicon-bonded hydrogen atoms only inside molecular chains.

The aforementioned linear diorganopolysiloxane having silicon-bonded hydrogen atoms only on both molecular-chain terminals may be the same as those exemplified above. Furthermore, linear diorganopolysiloxane having silicon-bonded hydrogen atoms only in side molecular chains may be selected from the following compounds: a methylhydridopolysiloxane having both molecular terminals sealed with trimethylsiloxy groups, a copolymer of methylhydridosiloxane and dimethylsiloxane having both molecular-chain terminals sealed with trimethylsiloxy groups, polymers having a part of methyl groups in the aforementioned polymers substituted by alkyl groups other than methyl groups, such as ethyl groups, propyl groups, etc., phenyl groups, 3,3,3-trifluoropropyl groups, or a mixture of two or more than two of the above polymers. If component (A) consists of a linear diorganopolysiloxane alone, in particular, of a linear diorganopolysiloxane alone that has alkenyl groups at both molecular-chain terminals, it is recommended to utilize component (B) in the form of a mixture of a linear diorganopolysiloxane having silicon-bonded hydrogen atom only on both molecular terminals with a linear diorganopolysiloxane having silicon-bonded hydrogen atoms only in side molecular chains. There are no special limitations with regard to a ratio between the aforementioned linear diorganopolysiloxane having silicon-bonded hydrogen atom only on both molecular terminals and the linear diorganopolysiloxane having silicon-bonded hydrogen atoms only in side molecular chains. It is recommended, however, that a weight ratio of the last-mentioned diorganopolysiloxane to the first-mentioned dioganopolysiloxane of the aforementioned mixture be within the range of 1 to 20%, preferably within the range of 1 to 10%, and still more preferably, within the range of 1 to 5%. If the ratio of the aforementioned components is below the recommended range, it would be difficult to cure the obtained silicone gel composition. If, on the other hand, the ratio exceeds the recommended range, it would be difficult to obtain the silicone gel which, at 25° C. and at shear frequency of 0.1 Hz, would after curing have a loss elastic modulus within the range of $1.0 \times 10^2$ to $1.0 \times 10^4$ Pa and a complex modulus of elasticity less than $1.0 \times 10^5$ Pa. Furthermore, the gel which fills or seals electrical or electronic components will show a tendency to formation of air bubbles and cracks.

It is recommended for the composition of the present invention that silicon-bonded hydrogen atoms be contained in component (B) in an amount of 0.2 to 5 moles, preferably, 0.8 to 1.2 moles against 1 mole of alkenyl groups in component (A). If the number of moles of silicon-bonded hydrogen atoms in component (B) against 1 mole of alkenyl groups in component (A) is lower than the recommended range, it would be difficult to cure the obtained silicone gel composition. If, on the other hand, the aforementioned range is exceeded, the obtained silicone gel will have impaired physical properties.

The silica powder of component (C) is a component which is used to endow the silicone gel obtained by curing the present composition with superior flame-retarding properties, as a result of this component (C) being used in combination with component (D). This silica powder is characterized by the fact that the specific surface area of said silica powder is 50 m$^2$/g or greater. Furthermore, it is desirable that the specific surface area of component (C) be 100 m$^2$/g or greater, and a specific surface area of 150 m$^2$/g or greater is especially desirable. The reason for this is that a silica powder whose specific surface area is less than the lower limit of the abovementioned range will not be uniformly dispersed, so that it becomes impossible to endow the silicone gel obtained with sufficient flame-retarding properties. Examples of silica powders which can be used as such a component (C) include fumed silica, precipitated silica or silica powders whose surfaces have been subjected to a hydrophobicizing treatment using hexamethyldisilazane, dimethyldichlorosilane or methyltrichlorosilane, etc.

The amount of component (C) that is mixed in the present composition is in the range of 0.01 to 15 parts by weight relative to 100 parts by weight of component (A). Preferably, this amount is in the range of 0.01 to 10 parts by weight, and an amount in the range of 0.01 to 5 parts by weight is especially desirable. The reasons for this are as follows: i.e., if the amount of component (C) that is mixed per 100 parts by weight of component (A) is less than the lower limit of the abovementioned range, the flame-retarding properties of the silicone gel that is obtained tend to drop; on the other hand, if the amount used exceeds the upper limit of the abovementioned range, the viscosity of the silicone gel composition that is obtained increases so that there is a drop in the fluidity and handling and working characteristics of the composition, and the transparency of the silicone gel that is obtained tends to drop.

The diamine compound of component (D) is a component which is used to endow the silicone gel obtained by curing the present composition with superior flame-retarding properties, as a result of this component (D) being used in combination with component (C). This component (D) is expressed by the following general formula:

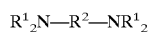

$$R^1{}_2N-R^2-NR^1{}_2$$

In the above formula, $R^1$ indicates hydrogen atoms or alkyl groups with 1 to 4 carbon atoms, which may be the same or different. Examples of alkyl groups which can be used as $R^1$ include methyl groups, ethyl groups, propyl groups and butyl groups. Furthermore, $R^2$ in the abovementioned formula indicates an alkylene group with 2 to 4 carbon atoms; examples of such alkylene groups include ethylene groups, propylene groups and butylene groups. In particular, ethylene groups are especially desirable. This component (D) is conventionally known as a component which is used to improve the storage stability of curable silicone compositions that are cured by a hydrosilylation reaction. This component used alone, however, cannot endow the silicone gel with flame-retarding properties. The present inventors discovered that the silicone gel can be endowed with conspicuous flame-retarding properties by using this component in combination with the abovementioned component (C); this discovery led to the present invention. Examples of such diamine compounds include N,N,N',N'-tetramethylethylenediamine, N,N-dimethylethylenediamine, N,N-diethylethylenediamine, N,N-dibutylethylenediamine and N,N,N',N'-tetraethylethylenediamine. N,N,N',N'-tetramethylethylenediamine is especially desirable.

The amount of component (D) that is mixed in the present composition is in the range of 0.0001 to 1.0 parts by weight per 100 parts by weight of component (A). This amount is preferably in the range of 0.0005 to 0.1 parts by weight, and an amount in the range of 0.0005 to 0.01 parts by weight is especially desirable. The reasons for this are as follows: i.e., if the amount of component (D) that is mixed per 100 parts by weight of component (A) is less than the lower limit of the abovementioned range, it is difficult to endow the silicone gel that is obtained with sufficient flame-retarding properties; on the other hand, if the amount used exceeds the upper limit of the abovementioned range, the curability of the silicone gel composition tends to drop. Moreover, in the present composition, it is necessary that the weight ratio of component (D) to component (C) be in the range of 0.0005 to 0.05, and this weight ratio is preferably in the range of 0.0005 to 0.01. The reasons for this are as follows: i.e., if the weight ratio of component (D) to component (C) is smaller than the lower limit of the abovementioned range, the effect of endowing the silicone gel with flame-retarding properties that is obtained by adding component (D) cannot be sufficiently manifested; on the other hand, if this weight ratio exceeds the upper limit of the abovementioned range, it becomes impossible to endow the silicone gel obtained with sufficient flame-retarding properties, and silicon gel composition that is obtained tends not to be cured.

The hydrosilylation catalyst of component (E) is a catalyst which is used to accelerate the curing of the present composition. Examples of catalysts which can be used include platinum type catalysts such as chloroplatinic acid, alcohol solutions of chloroplatinic acid, complexes of platinum and olefins, complexes of platinum and 1,3-divinyl-1,1,3,3-tetramethyldisiloxane, and powders on which platinum is supported, etc.; palladium type catalysts such as tetrakis (triphenylphosphine)palladium, palladium black and mixtures [of palladium] with triphenylphosphine; and rhodium type catalysts. Platinum type catalysts are especially desirable.

In the present composition, the amount of component (E) that is added is a catalytic amount. In cases where a platinum type catalyst is used as component (E), it is desirable from a practical standpoint that the amount of platinum metal of this catalyst in the abovementioned composition be in the range of 0.01 to 1000 ppm in weight units, and an amount in the range of 0.1 to 500 ppm is especially desirable.

Furthermore, for example, hydrosilylation reaction regulating agents such as acetylene compounds, organo-phosphorus compounds or vinyl-group-containing siloxane compounds, etc., inorganic fillers such as pulverized quartz, titanium oxide, magnesium carbonate, zinc oxide, iron oxide, diatomaceous earth or carbon black, etc., inorganic fillers obtained by subjecting the surfaces of the abovementioned inorganic fillers to a hydrophobicizing treatment using an organo-silicon compound, etc., and other components such as flame-retarding additives, heat-resistant additives, pigments or dyes, etc., may be mixed with the present composition as optional components as long as there is no loss of the object of the present invention.

The silicone gel composition for use as a sealant and filler for electrical and electronic components provided by the present invention is characterized by the fact that this composition is cured to form a silicone gel which has a loss elastic modulus of $1.0 \times 10^2$ to $1.0 \times 10^4$ Pa, and a complex elastic modulus of $1.0 \times 10^5$ Pa or less, at a temperature of 25° C. and a shear frequency of 0.1 Hz. Preferably, the present invention is characterized by the fact that a silicone gel in which the abovementioned loss elastic modulus is $3.0 \times 10^2$ to $3.0 \times 10^3$ Pa and the abovementioned complex elastic modulus is $1.0 \times 10^4$ Pa or less is formed. The present invention was devised as a result of the discovery that even when electrical or electronic components that are sealed or filled by means of a silicon gel which has such a specified loss elastic modulus and complex elastic modulus are subjected to a heat cycle, the formation of gas bubbles or cracks in this silicone gel is inhibited.

There are no restrictions on electrical or electronic components which can be sealed or filled by means of the present composition; however, the present invention is especially effective in electrical or electronic components in which the gaps between electrodes and other electrodes, electrical elements and other electrical elements, or electrical elements and the package, etc., are narrow, or components with structures which are such that it is difficult for these structures to conform to the expansion and contraction of the silicone gel. For example, such components include semiconductor elements such as IC's, hybrid IC's and LSI's, etc., and electrical circuits or modules which mount such semiconductor elements and electrical elements such as capacitors or electrical resistors, etc., e.g., various sensors such as pressure sensors, etc., which are generally sealed or filled by means of a silicone gel, and igniters or regulators which are used in automobiles. The loss elastic modulus and complex elastic modulus (at a temperature of 25° C. and a shear frequency of 0.1 Hz) of the silicone gel obtained by curing the present composition are determined by (for example) preparing the silicone gel in the form of a circular plate with a thickness of 5 to 6 mm and a diameter of 20 mm, and then measuring this plate by means of a dynamic viscoelasticity measuring apparatus.

There are no restrictions on the method used to seal or fill electrical or electronic components using the silicone gel composition for use as a sealant and filler for electrical and electronic components provided by the present invention; for example, a method in which the electrical or electronic components are sealed or filled by means of the abovementioned composition, after which this composition is cured by heating, is desirable. In this case, if the heating temperature is [too] high, the formation of gas bubbles and cracks in the silicone gel is accelerated. Accordingly, it is desirable to heat the composition to a temperature in the range of 50 to 250° C., and heating to a temperature in the range of 70 to 130° C. is especially desirable.

EXAMPLES

The silicone gel composition for use as a sealant and filler for electrical and electronic components provided by the present invention and the silicone gel of the present invention will be described below in detail in terms of preferred embodiments. Furthermore, the characteristics shown in the embodiments are values measured at 25° C., and the characteristics of the silicone gel were measured as shown below.

Loss Elastic Modulus and Complex Elastic Modulus of the Silicone Gel

In each case, the silicone gel composition for use as a sealant and filler for electrical and electronic components provided by the present invention was heated for 1 hour at 125° C., thus producing a circular plate-form silicone gel with a thickness of 5 to 6 mm and a diameter of 20 mm. The loss elastic modulus and complex elastic modulus of this silicone gel at a temperature of 25° C. and a shear frequency of 0.1 Hz were measured by means of a dynamic viscoelasticity measuring device manufactured by Rheometric Co. (commercial name: Dynamic Analyzer ARES).

¼ Consistency of the Silicone Gel

The silicone gel composition for use as a sealant and filler for electrical and electronic components provided by the present invention was poured gently into a 50-ml glass beaker, and was then heated for 1 hour at 125° C., thus producing a silicone gel. The ¼ consistency of this silicone gel was measured by the method stipulated in JIS K 2220.

Flame-Retarding Properties of the Silicone Gel

In each case, the silicone gel composition for use as a sealant and filler for electrical and electronic components was poured into a Teflon vessel, and was heated for 1 hour at 125° C., thus producing a silicon gel test sample with a width of 12.7 mm, a length of 127 mm and a thickness of 3 mm. This test sample was fixed in a vertical position, and the lower portion of this test sample was positioned for approximately 10 seconds at the approximate center of the 20 mm flame (blue flame: 10 mm) of a gas burner whose chief component was methane gas. Afterward, the gas burner was removed, and the time required for the test sample to be completely extinguished was measured. Furthermore, immediately after the test sample was completely extinguished, the abovementioned operation was repeated, and the time required for the test sample to be extinguished (combustion time) was measured. This operation was repeated twice for each of five test samples, and the total combustion time for 10 measurements was determined.

Examples 1 Through 6 and Comparative Examples 1 Through 5

The components described below were mixed at the composition ratios (parts by weight) shown in Table 1, thus producing colorless transparent silicone gel composition for use as a sealant and filler for electrical and electronic components. Furthermore, "SiH/SiCH=CH2" in Table 1 indicates the molar ratio of hydrogen atoms bonded to silicon atoms contained in the abovementioned organopolysiloxane containing hydrogen atoms bonded to silicon atoms, per mole of alkenyl groups contained in the abovementioned organopolysiloxane containing alkenyl groups in the present composition.

Component a-1

Branched organopolysiloxane with a viscosity of 0.8 Pa.s, consisting of 93.50 mol % $(CH_3)_2SiO_{2/2}$ units, 3.30 mol % $CH_3SiO_{3/2}$ units, 2.60 mol % $(CH_3)_3SiO_{1/2}$ units, and 0.60 mol % $(CH_3)_2(CH_2=CH)SiO_{1/2}$ units (vinyl group content: 0.22 wt %).

Component a-2

Branched organopolysiloxane with a viscosity of 0.87 Pa.s, consisting of 93.50 mol % $(CH_3)_2SiO_{2/2}$ units, 3.30 mol % $CH_3SiO_{3/2}$ units, 1.60 mol % $(CH_3)_3SiO_{1/2}$ units, and 1.60 mol % $(CH_3)_2(CH_2=CH)SiO_{1/2}$ units (vinyl group content: 0.58 wt %).

Component a-3

Dimethylpolysiloxane with a viscosity of 2 Pa.s, in which both molecular-chain terminals are sealed by dimethylvinylsiloxy groups (vinyl group content: 0.23 wt %).

Component a-4

Dimethylpolysiloxane with a viscosity of 0.36 Pa.s, in which both molecular-chain terminals are sealed by dimethylvinylsiloxy groups (vinyl group content: 0.48 wt %).

Component a-5

Dimethylpolysiloxane with a viscosity of 0.93 Pa.s, in which both molecular-chain terminals are sealed by dimethylvinylsiloxy groups (vinyl group content: 0.11 wt %).

Component b-1

Dimethylpolysiloxane with a viscosity of 0.016 Pa.s, in which both molecular-chain terminals are sealed by dimethylhydridosiloxy groups (content of hydrogen atoms bonded to silicon atoms=0.13 wt %).

Component b-2

Dimethylsiloxane-methylhydridosiloxane copolymer with a viscosity of 0.004 Pa.s, in which both molecular-chain terminals are sealed by trimethylsiloxy groups (content of hydrogen atoms bonded to silicon atoms=0.78 wt %).

Component c

Fumed silica with a specific surface area of 200 m²/g, which has been surface-treated with hexamethyldisilazane.

Component d

N,N,N',N'-Tetramethylenediamine.

Component e 1,3-divinyl-1,1,3,3-tetramethyldisiloxane complex of platinum in which the platinum concentration is 0.5 wt % (vinyl group content=2.48 wt %).

An electrical/electronic component (for use in evaluation) of the type shown in FIG. 1 was constructed using the abovementioned silicone gel compositions for use as a sealant and filler for electrical and electronic components. Specifically, 30 g of the silicone gel composition for use as a sealant and filler for electrical and electronic components prepared using the composition ratio shown in Table 1 was poured into an electrical/electronic component, in which electrodes (2, 2') with a diameter of 2 mm and a length of 45 mm were carefully placed in a glass Petri dish (1) with a diameter of 80 mm and a height of 12 mm so that the gap between the electrodes was 1 mm, and in which a 50 mm×50 mm×1 mm glass plate (3) was placed on top of these electrodes. Then, following vacuum defoaming for 10 minutes at room temperature and a pressure of 667 Pa or less, this sample was heated together with the glass Petri dish for 1 hour in an oven at 125° C., thus curing the silicone gel composition for use as a sealant and filler for electrical and electronic components so that a gel (4) was formed. This electrical/electronic component was allowed to stand for one week at 25° C., and was then subjected to a heat cycle test in which one cycle consisted of allowing the component to stand for 24 hours at 50° C. and then allowing the component to stand for 24 hours at 25° C. Then, the presence or absence of bubbles and cracks (5) in the silicone gel (4) sealing or filling this electrical/electronic component was observed, along with the extent of any such bubbles or cracks. Furthermore, a voltage was applied across the electrodes (2, 2') of this electrical/electronic component at a voltage elevation rate of 1 kV/sec, and the insulation breakdown strength was measured. Moreover, following five cycles of the abovementioned heat cycle test, the presence or absence of bubbles and cracks (5) in the silicone gel (4) sealing or filling the electrical/electronic component was observed, along with the extent of any such bubbles or cracks. The results obtained are shown in Table 1. Furthermore, the symbols indicating presence/absence and extent of gas bubbles and cracks in the table have the following meanings:

⊙: absolutely no gas bubbles or cracks formed.
○: gas bubbles or cracks formed; size less than 10 mm.
Δ: gas bubbles or cracks formed; size 10 mm to 30 mm.
X: gas bubbles or cracks formed; size exceeding 30 mm.

|  |  | Practical Examples | | | | | Comparative Examples | | | | | |
|---|---|---|---|---|---|---|---|---|---|---|---|---|
| Division Item | | 1 | 2 | 3 | 4 | 5 | 1 | 2 | 3 | 4 | 5 | 6 |
| Com- | Component a-1 | 43 | 37 | 50 | — | — | 100 | — | — | 43 | 43 | 43 |
| po- | Component a-2 | 7 | 13 | — | — | — | — | — | — | 7 | 7 | 7 |
| sition | Component a-3 | 50 | 50 | — | — | — | — | — | 50 | 50 | 50 | 50 |
| parts | Component a-4 | — | — | 50 | 50 | 100 | — | — | 50 | — | — | — |
| by | Component a-5 | — | — | — | 50 | — | — | 100 | — | — | — | — |
| weight | Component b-1 | 7.3 | 7.8 | 12.3 | 4.8 | 10.5 | 6.7 | — | — | 7.3 | 7.3 | 7.3 |
|  | Component b-2 | — | — | — | 0.3 | 0.1 | — | 0.5 | 1.7 | — | — | — |
|  | Component c | 0.5 | 2.0 | 0.5 | 0.5 | 0.5 | 0.5 | 0.5 | 0.5 | — | 0.5 | 0.01 |
|  | Component d | 0.002 | 0.002 | 0.004 | 0.002 | 0.002 | 0.002 | 0.002 | 0.002 | 0.002 | — | 0.001 |
|  | Component e | 0.2 | 0.2 | 0.2 | 0.2 | 0.2 | 0.2 | 0.2 | 0.2 | 0.2 | 0.2 | 0.2 |
| SiH/SiCH=$CH_2$ | | 1.0 | 1.0 | 1.2 | 0.8 | 0.8 | 1.1 | 1.0 | 1.0 | 1.0 | 1.0 | 1.0 |
| ¼ consistency | | 71 | 49 | 99 | 53 | 85 | 87 | 80 | 52 | 72 | 71 | 72 |
| Loss elastic modulus (Pa) | | $4.5 \times 10^2$ | $7.8 \times 10^2$ | $4.5 \times 10^2$ | $2.0 \times 10^2$ | $5.2 \times 10^2$ | $7.2 \times 10^1$ | $4.5 \times 10^1$ | $5.2 \times 10^1$ | $4.5 \times 10^2$ | $4.5 \times 10^2$ | $4.5 \times 10^2$ |
| Complex elastic modulus (Pa) | | $1.2 \times 10^3$ | $4.5 \times 10^3$ | $1.8 \times 10^2$ | $3.0 \times 10^3$ | $4.5 \times 10^2$ | $3.3 \times 10^2$ | $9.4 \times 10^2$ | $3.5 \times 10^3$ | $1.2 \times 10^3$ | $1.2 \times 10^3$ | $1.2 \times 10^3$ |
| Flame-retarding properties (sec) | | 165 | 128 | 145 | 182 | 127 | 135 | 152 | 140 | 340 | 390 | 352 |
| Presence/absence and extent of gas bubbles/cracks | 1 cycle | ⊙ | ⊙ | ⊙ | ⊙ | ⊙ | X | X | X | ⊙ | ⊙ | ⊙ |
|  | 5 cycles | ⊙ | ⊙ | ○ | ⊙ | ○ | X | X | X | ⊙ | ⊙ | ⊙ |
| Insulation breakdown strength | KV/mm | 20 | 19 | 20 | 17 | 18 | 3 | 2 | 2 | 17 | 19 | 20 |

The silicone gel composition for use as a sealant or filler for electrical and electronic components provided by the present invention is characterized by the fact that [a] the formation of gas bubbles and cracks in the silicone gel sealing or filling the electrical or electronic component is inhibited, and [b] the flame-retarding properties of this silicone gel are superior. Furthermore, the silicon gel of the present invention seals or fills electrical or electronic components, and is characterized by the fact that [a] the formation of gas bubbles and cracks is inhibited, and [b] this gel has superior flame-retarding properties.

That which is claimed is:

1. A silicone gel composition, comprising:
   (A) 100 parts by weight of an organopolysiloxane containing at least two alkenyl groups per molecule and having a viscosity of 0.01 to 100 Pa.s at 25° C.;
   (B) an organopolysiloxane containing at least two silicon-bonded hydrogen atoms per molecule and having a viscosity of 0.001 to 10 Pa.s at 25° C. in an amount sufficient to provide from 0.2 to 5 moles of silicon-bonded hydrogen atoms per one mole of alkenyl groups in component (A);
   (C) 0.01 to 15 parts by weight of a silica powder having a specific surface area of at least 50 $m^2/g$;
   (D) 0.0001 to 1.0 part by weight of a diamine compound represented by the following general formula:

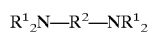

$$R^1_2N\text{—}R^2\text{—}NR^1_2$$

wherein each $R^1$ is independently a hydrogen atom or an alkyl group having 1 to 4 carbon atoms, and $R^2$ is an alkylene group having 2 to 4 carbon atoms; and
   (E) a hydrosilylation catalyst in a catalytic quantity;
   wherein the weight ratio of component (D) to component (C) in the gel composition is from 0.0005 to 0.05.

2. The composition according to claim 1, wherein component (A) is selected from the group consisting of a branched organopolysiloxane, a linear organopolysiloxane, or a mixture of a branched organopolysiloxane and a linear organopolysiloxane.

3. The composition according to claim 2, wherein component (A) is selected from the group consisting of a branched organopolysiloxane and a mixture of a branched organopolysiloxane and a linear organopolysiloxane, and component (B) is a is a linear diorganopolysiloxane having silicon-bonded hydrogen atoms only on both terminals of the molecular chain.

4. The composition according to claim 2, wherein component (A) is a mixture of a branched organopolysiloxane and a linear organopolysiloxane, the mixture containing from 5 to 95 wt. % of the branched organopolysiloxane.

5. The composition according to claim 2, wherein the branched organopolysiloxane contains $R_2SiO_{2/2}$ units, $RSiO_{3/2}$ units, and $R_3SiO_{1/2}$ units wherein R is a monovalent hydrocarbon group.

6. The composition according to claim 5, wherein the branched organopolysiloxane contains 80 to 99.65 mole % $R_2SiO_{2/2}$ units and 0.1 to 10 mole % $RSiO_{3/2}$ units, the remainder being $R_3SiO_{1/2}$ units.

7. The composition according to claim 2, wherein component (A) is a linear organopolysiloxane and component (B) is a mixture of a linear diorganopolysiloxane having silicon-bonded hydrogen atoms only inside molecular chains and a linear diorganopolysiloxane having silicon-bonded hydrogen atoms only on both terminals of the molecular chains.

8. The composition according to claim 7, wherein component (A) is a linear organopolysiloxane having alkenyl groups only on both terminals of the molecular chain.

9. The composition according to claim 7, wherein the weight ratio of the linear diorganopolysiloxane having silicon-bonded hydrogen atoms only inside molecular chains to the linear diorganopolysiloxane having silicon-bonded hydrogen atoms only on both terminals of the molecular chains is from 1 to 20%.

10. The composition according to claim 1, wherein the amount of component (B) is sufficient to provide from 0.8 to 1.2 moles of silicon-bonded hydrogen atoms per one mole of alkenyl groups in component (A).

11. The composition according to claim 1, wherein component (C) has a specific surface area of at least 100 m²/g.

12. The composition according to claim 1, wherein the amount of component (C) is from 0.01 to 10 parts by weight per 100 parts by weight of component (A).

13. The composition according to claim 1, wherein $R^2$ in component (D) is ethylene.

14. The composition according to claim 13, wherein component (D) is N,N,N',N'-tetramethylethylenediamine.

15. The composition according to claim 1, wherein the weight ratio of component (D) to component (C) is from 0.0005 to 0.01.

16. The composition according to claim 1, wherein component (E) is a platinum catalyst.

17. The composition according to claim 1, wherein the composition is disposed on an electronic component.

18. A method of sealing or filling an electrical or electronic component comprising the steps of:
   I. sealing or filling the part with a silicone gel composition, comprising:
      (A) 100 parts by weight of an organopolysiloxane containing at least two alkenyl groups per molecule and having a viscosity of 0.01 to 100 Pa.s at 25° C.;
      (B) an organopolysiloxane containing at least two silicon-bonded hydrogen atoms per molecule and having a viscosity of 0.001 to 10 Pa.s at 25° C. in an amount sufficient to provide from 0.2 to 5 moles of silicon-bonded hydrogen atoms per one mole of alkenyl groups in component (A);
      (C) 0.01 to 15 parts by weight of a silica powder having a specific surface area of at least 50 m²/g;
      (D) 0.0001 to 1.0 part by weight of a diamine compound represented by the following general formula:

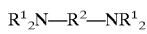

wherein each $R^1$ is independently a hydrogen atom or an alkyl group having 1 to 4 carbon atoms, and $R^2$ is an alkylene group having 2 to 4 carbon atoms; and
      (E) a hydrosilylation catalyst in a catalytic quantity;
      wherein the weight ratio of component (D) to component (C) in said gel composition is from 0.0005 to 0.05; and
   II. heating the silicone gel composition.

19. The method according to claim 18, wherein the step of heating the silicone gel composition is carried out at a temperature of from 50 to 250° C.

20. The method according to claim 19, wherein the step of heating the silicone gel composition is carried out at a temperature of from 70 to 130° C.

* * * * *